(12) United States Patent
Stageberg et al.

(10) Patent No.: US 7,187,519 B2
(45) Date of Patent: Mar. 6, 2007

(54) HIGH GRADIENT DISC DRIVE WRITER

(75) Inventors: Frank E. Stageberg, Edina, MN (US); Martin L. Plumer, Bloomington, MN (US); Vee S. Kong, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 460 days.

(21) Appl. No.: 10/726,881

(22) Filed: Dec. 3, 2003

(65) Prior Publication Data

US 2005/0122619 A1 Jun. 9, 2005

(51) Int. Cl.
*G11B 5/147* (2006.01)

(52) U.S. Cl. ...................................... 360/126
(58) Field of Classification Search ................ None
See application file for complete search history.

(56) References Cited

U.S. PATENT DOCUMENTS

| | | | |
|---|---|---|---|
| 5,452,166 A | 9/1995 | Aylwin et al. | |
| 6,301,076 B1 | 10/2001 | Stageberg et al. | |
| 6,381,093 B2 | 4/2002 | Yoshida et al. | |
| 6,477,006 B1 | 11/2002 | Sato | |
| 6,477,007 B1 | 11/2002 | Shukh et al. | |
| 6,493,183 B1 | 12/2002 | Kasiraj et al. | |
| 6,500,351 B1 | 12/2002 | Wu et al. | |
| 6,501,619 B1 | 12/2002 | Sherrer et al. | |
| 6,504,677 B1 * | 1/2003 | Chen et al. | 360/126 |
| 6,515,824 B1 | 2/2003 | Sato | |
| 6,762,911 B2 * | 7/2004 | Sasaki et al. | 360/126 |
| 6,791,795 B2 * | 9/2004 | Ohtomo et al. | 360/126 |
| 6,885,519 B2 * | 4/2005 | Sasaki | 360/126 |
| 7,016,149 B2 * | 3/2006 | Kutsuzawa et al. | 360/126 |
| 7,046,480 B2 * | 5/2006 | Sasaki et al. | 360/126 |

* cited by examiner

*Primary Examiner*—Robert S. Tupper
(74) *Attorney, Agent, or Firm*—Kinney & Lange, P.A.

(57) ABSTRACT

A magnetic writer having an air bearing surface for confronting a surface of a rotating disc is disclosed. The magnetic writer includes a bottom pole and a top pole. The top pole includes a first top pole portion and a second top pole portion connected by a top pole extension. The top pole extension, which preferably has a uniform width at the air bearing surface, orients a magnetization of the first top pole portion substantially parallel to an air bearing surface of the magnetic writer. The bottom pole includes a base pole and a notch pole. The base pole is recessed from the air bearing surface to prevent or reduce fringe erasure fields. The notch pole, which abuts the base pole and extends from the air bearing surface to at least a magnetic throat height of the magnetic writer, has a magnetization oriented perpendicular to the air bearing surface.

18 Claims, 4 Drawing Sheets

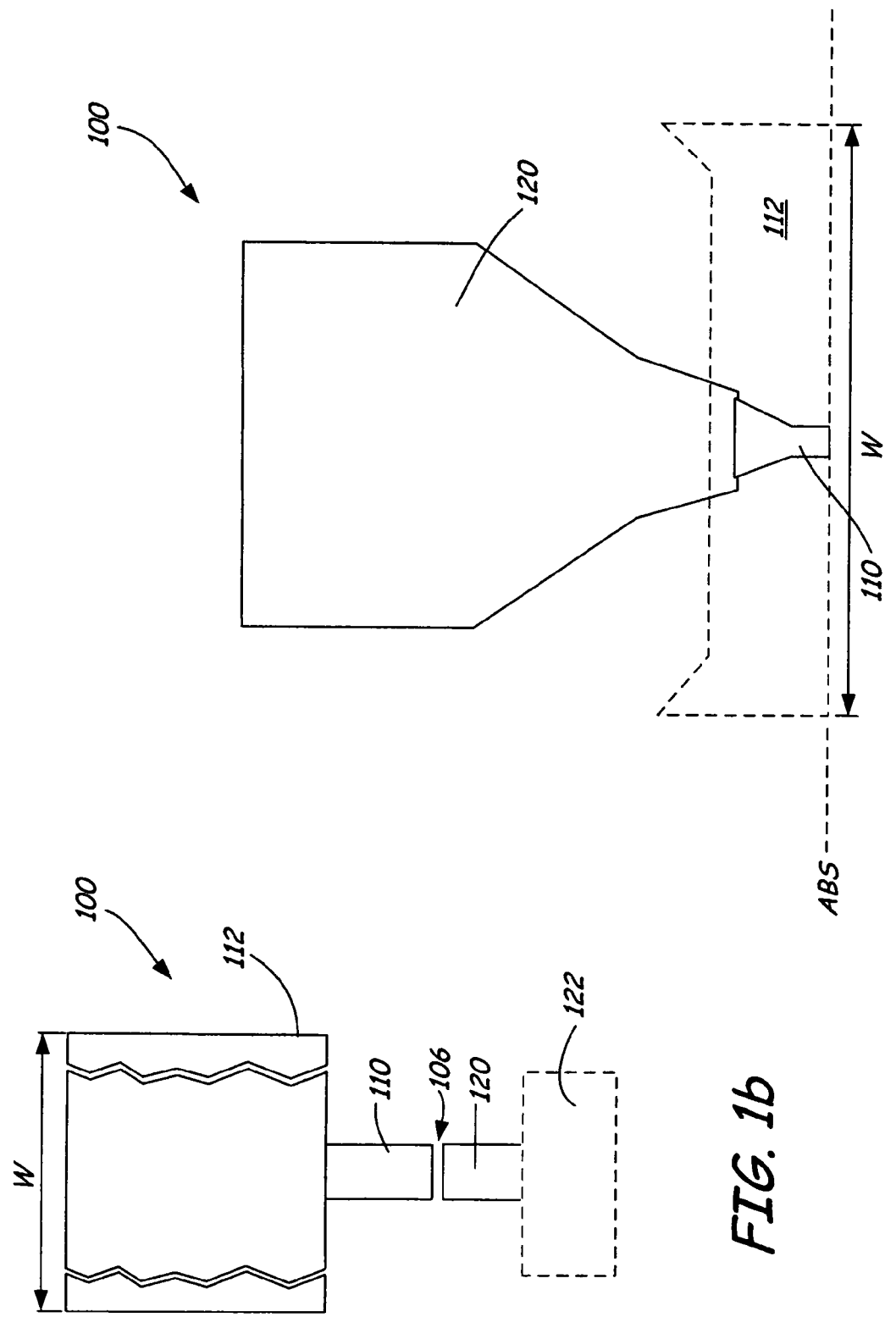

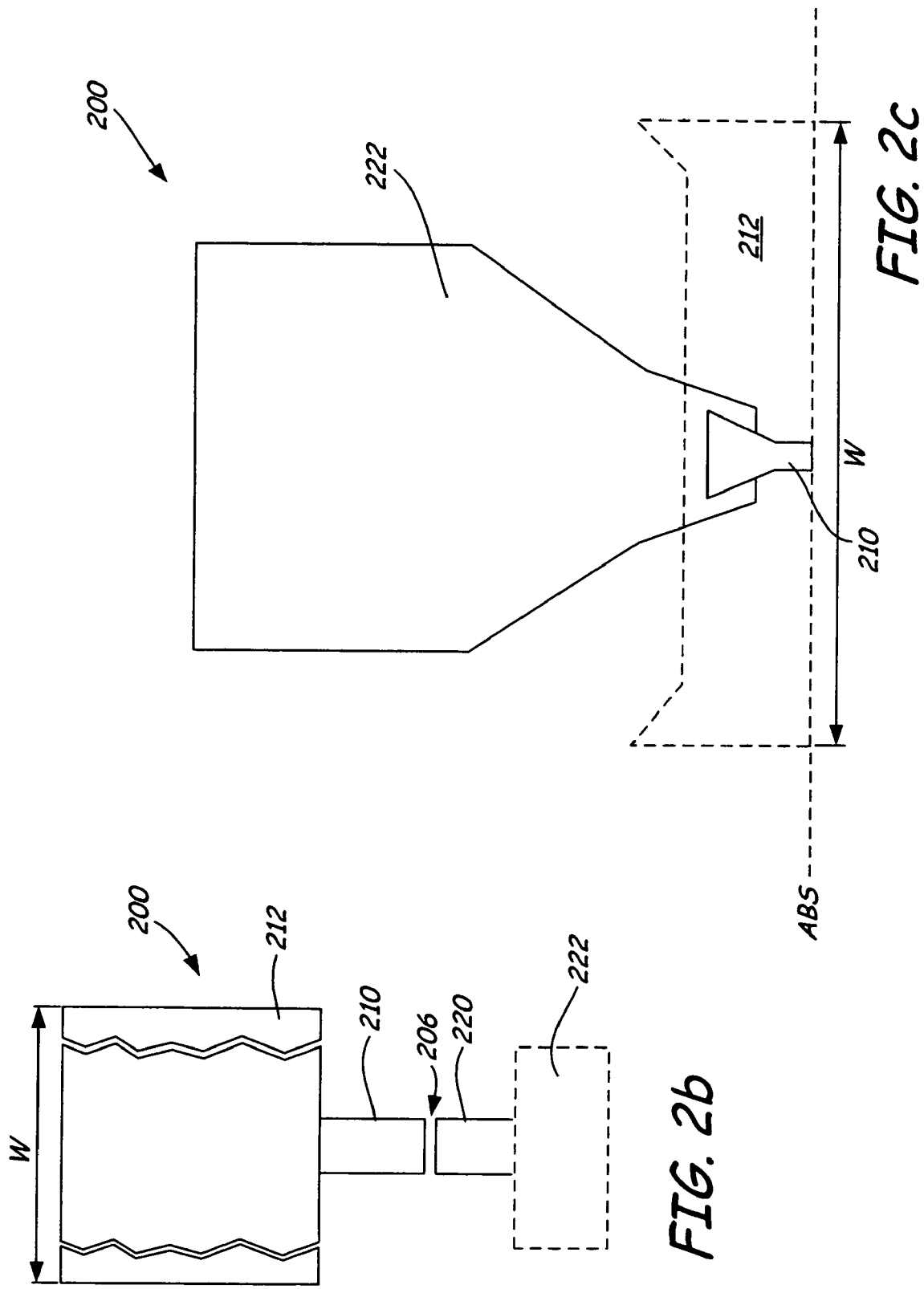

HIGH GRADIENT DISC DRIVE WRITER

BACKGROUND OF THE INVENTION

The present invention relates generally to the field of magnetic data storage and retrieval systems. In particular, the present invention relates to a magnetic recording head with a writer portion having a high field gradient and cross-track field uniformity.

In an electronic data storage and retrieval system, a transducing head typically includes a writer for storing magnetically-encoded information on a magnetic disc and a reader for retrieving that magnetically-encoded information from the magnetic disc. The reader typically has two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electric current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

In magnetic recording, it is desirable to improve the areal density at which information can be recorded and reliably read. This desire has led to a trend toward shorter bit length along a magnetic recording track and a shrinking track width. Narrow track widths are achieved by use of narrow pole tips at an air bearing surface (ABS) of the head. However, a narrower pole tip causes in a weakening of fringing magnetic fields in the gap layer that write data to the magnetic medium. This results in inconsistent writer performance.

One possibility for improving the strength of the gap fringing fields at the magnetic medium is to reduce the spacing between the writer and the medium, thereby bringing the stronger fringing fields at the pole tip closer to the medium. However, as pole tips continue to decrease in size (and the strength of gap fringing fields correspondingly decreases), it becomes increasingly difficult to bring the writer closer to the medium while maintaining a sufficient fly height above the medium. Another possibility is to increase the gap fringing field strength by making the poles out of a material with a higher magnetic saturation moment. While this may improve the gap fringing field strength, the level of improvement is limited by the physics of the materials available. Thus, there is a need for a writer having improved fringing magnetic fields at the write gap.

BRIEF SUMMARY OF THE INVENTION

The present invention is a magnetic writer having an air bearing surface for confronting a surface of a rotating disc. The magnetic writer includes a bottom pole and a top pole. The top pole includes a first top pole portion and a second top pole portion connected by a top pole extension. The top pole extension, which preferably has a uniform width at the air bearing surface, orients a magnetization of the first top pole portion substantially parallel to an air bearing surface of the magnetic writer. This minimizes distortion to transitions on the disc. The bottom pole includes a base pole and a notch pole. The base pole is recessed from the air bearing surface to prevent or reduce fringe erasure fields. The notch pole, which abuts the base pole, has a magnetization oriented perpendicular to the air bearing surface, which maximizes the total field strength in the write gap region, yet avoids distortion to media transitions at the first top pole portion. In one embodiment, the notch pole extends from the air bearing surface beyond the magnetic throat height of the magnetic writer. In another embodiment, the notch pole extends from the air bearing surface to the magnetic throat height of the magnetic writer. Preferably, both the base pole and the notch pole have a flared shape to increase magnetic flux near the air bearing surface.

BRIEF DESCRIPTION OF THE DRAWINGS

FIG. 1b is an air bearing surface (ABS) view of the magnetic writer shown in FIG. 1a.

FIG. 1c is a top view of the magnetic writer shown in FIG. 1a.

FIG. 2b is an air bearing surface (ABS) view of the magnetic writer shown in FIG. 2a.

FIG. 2c is a top view of the magnetic writer shown in FIG. 2a.

DETAILED DESCRIPTION

Figure 1A:
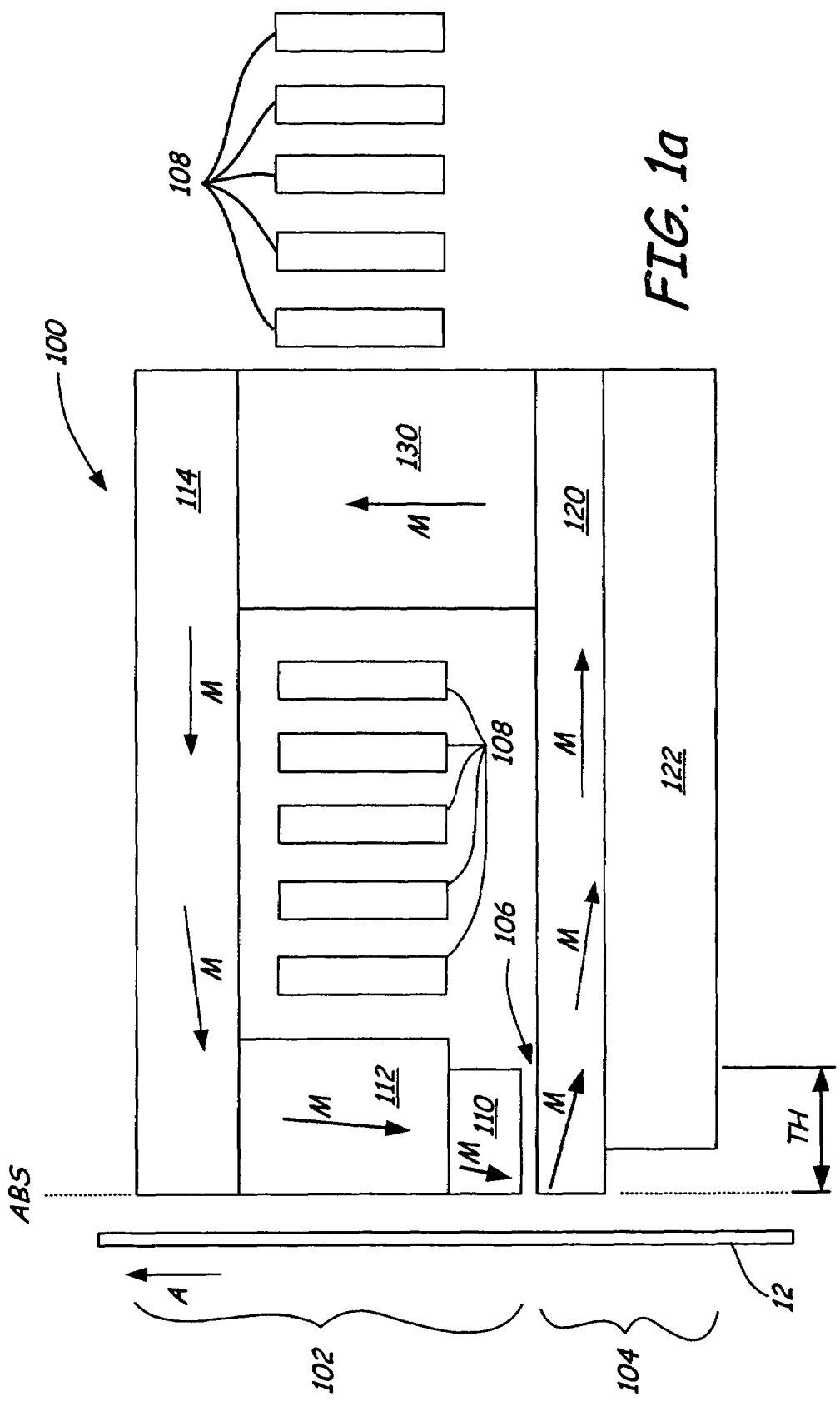
FIG. 1a is a cross-section view of a magnetic writer according to an embodiment of the present invention.

FIG. 1a is a cross-section view, FIG. 1b is an ABS view, and FIG. 1c is a top view of magnetic writer 100 according to an embodiment of the present invention. Magnetic writer 100 includes top pole 102 and bottom pole 104 separated by gap layer 106. Conductive coils 108 pass through the space between top pole 102 and bottom pole 104. Top pole 102 includes first top pole portion 110, top pole extension 112, and second top pole portion 114. Top pole extension 112 is positioned between first top pole portion 110 and second top pole portion 114. Bottom pole 104 includes notch pole 120 and base pole 122. Base pole 122 is recessed from the ABS and abuts notch pole 120. Top pole 102 and bottom pole 104 are connected to each other distal from the ABS by back gap closer 130. The turns of conductive coils 108 surround back gap closer 130. In FIGS. 1b and 1c, second top pole portion 114 is omitted for clarity, to show the shape of first top pole portion 110, top pole extension 112, and notch pole 120, and to show the position of each of these elements with respect to each other. Near the ABS, the shape of notch pole 120 matches that of first top pole portion 110.

In operation, the ABS of magnetic writer 100 faces a surface of magnetic disc 12. Magnetic disc 12 travels or rotates in a direction relative to magnetic writer 100 as indicated by arrow A. To write data, an electric current is caused to flow through conductive coils 108. The magnetomotive force (mmf) in the coils magnetizes the combined pole structure of magnetic writer 100 and induces a magnetic field across write gap 106 between top pole 102 and bottom pole 104. Top pole 102 is the trailing pole of the two poles and is used to physically write data to magnetic disc 12. In particular, first top pole portion 110 writes data to magnetic disc 12 because this is the portion of the trailing pole nearest write gap 106.

Magnetic writer 100 provides a high gradient field at the ABS. When an electric current is caused to flow through conductive coils 108, a magnetic flux is flows through top pole 102 and bottom pole 104, as is shown by the magnetic flux arrows, M, on each portion of top pole 102 and bottom pole 104. For optimal functionality of magnetic writer 100, the magnetic flux should be flowing parallel or substantially parallel to the ABS at the writing pole (first top pole portion 110). As is shown, the magnetic flux flows perpendicular to the ABS through second top pole portion 114. By incorporating top pole extension 112, the magnetic flux direction is changed from flowing perpendicular to the ABS at second top pole portion 114 to flowing substantially parallel to the ABS at first top pole portion 110. Top pole extension 112 has more length than first top pole portion 110 along the ABS, which allows the magnetic flux to transition from flowing perpendicular to the ABS at second top pole portion 114 to generally parallel to the ABS at first top pole portion 110. This minimizes distortion to data transitions on magnetic disc 12, which are formed at first top pole portion 110 where the writing field is equal to the effective dynamic coercivity of magnetic disc 12. Furthermore, as can be seen in FIG. 1b, top pole extension 112 has a uniform width, w, at the ABS. This reduces or eliminates excessive fringe erasure fields emanating from top pole extension 112, since the uniform width at the ABS prevents high magnetization levels. Also, this design minimizes the area of overlap between base pole 122 and top pole extension 112 to keep fringe fields below erasure threshold.

In a preferred embodiment, notch pole 120 has a substantially funneled or flared shape, as can be seen in FIG. 1c. Flared notch pole 120 abuts base pole 122, and both are oriented such that their long dimension extends away from the ABS. This configuration causes the leading edge pole (notch pole 120) to magnetize strongly in a direction perpendicular to the ABS. Consequently, the total field strength in write gap 106 is maximized at the ABS where magnetic disc 12 is written. At the same time, distortion to media transitions at the trailing pole (first top pole portion 110) is prevented.

The magnetic throat height of magnetic writer 100 is the distance from the ABS to a back edge of first top pole portion 110 distal from the ABS. To further enhance the magnetic field strength in write gap 106, notch pole 120 extends beyond the magnetic throat height of magnetic writer 100. Further, a magnetization of notch pole 120 is oriented generally perpendicular to the ABS. As a result, notch pole 120 transmits additional magnetic flux, while leakage flux area remains fixed and defined by the magnetic throat height.

Magnetic writer 100 may be formed by, for example, a sputtered gap process. Base pole 122 is first formed such that it is recessed from the ABS plane (which is later set during machining of the slider). Base pole 122 has a substantially flared or funneled shape such that the narrow portion of the substantially flared or funnel shape is proximate to the ABS. Base pole 122 is then encapsulated in dielectric and planarized to provide a base onto which notch pole 120 and gap layer 106 are sputtered. First top pole portion 110 is then plated onto gap layer 106 into a funnel-shaped photopattern. An ion mill mask is then placed such that it protects notch pole 120 beyond an edge of first top pole portion 110 distal from the ABS. An ion mill then removes material from notch pole 120 such that notch pole 120 has a substantially similar shape as first top pole portion 110 proximate to the ABS. Notch pole 120 has a substantially flared or funnel shape extending away from first top pole portion 110, as determined by the shape of the ion mill mask. This structure is then encapsulated in a dielectric, and then a chemical mechanical polish (CMP) planarization exposes a surface of first top pole portion 110 opposite gap layer 106. After conductive coils 108 are plated, top pole extension 112 is then formed on the exposed surface of first top pole portion 110 such that top pole extension 112 is in direct contact with first top pole portion 110. Back gap closer 130 and second top pole portion 114 are then formed to complete magnetic writer 100.

For magnetic writer 100 as shown in FIGS. 1a–1c, magnetic response to passing an electric current through the coils is a strong field in the vicinity of write gap 106 at the ABS, a high gradient in the trailing pole (first top pole portion 110) region, relatively uniform cross-track response, and acceptable stray fringing fields. The response of magnetic disc 12 is good overwrite of previous data and sharp transitions with minimal cross track distortion.

Figure 2A:
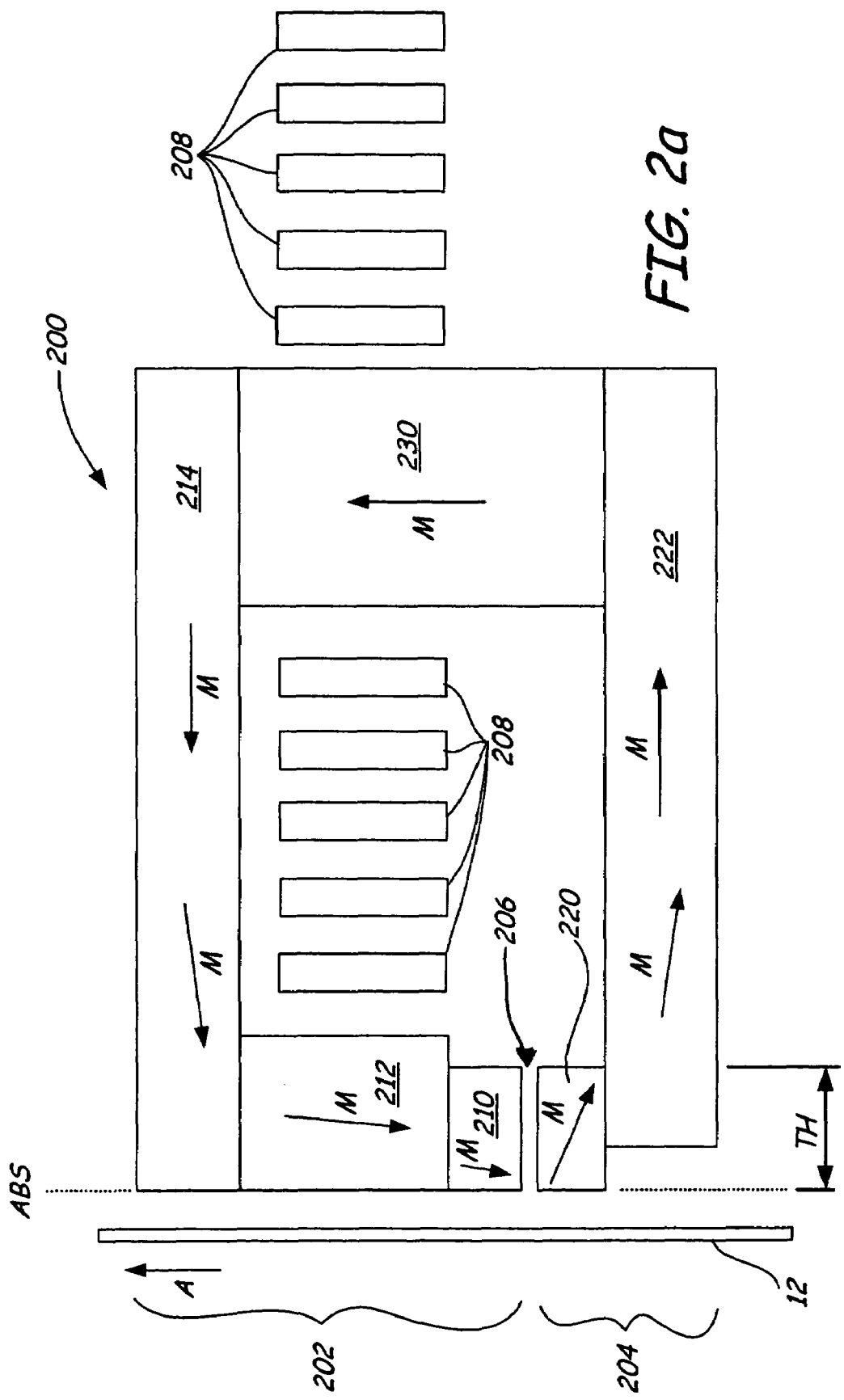
FIG. 2a is a cross-section view of a magnetic writer according to another embodiment of the present invention.

FIG. 2a is a cross-section view, FIG. 2b is an air bearing surface view, and FIG. 2c is a top view of magnetic writer 200 according to another embodiment of the present invention. Magnetic writer 200 includes top pole 202 and bottom pole 204 separated by gap layer 206. Conductive coils 208 pass through gap layer 206. Top pole 202 includes first top pole portion 210, top pole extension 212, and second top pole portion 214. Top pole extension 212 is positioned between first top pole portion 210 and second top pole portion 214. Bottom pole 204 includes notch pole 220 and base pole 222. Base pole 222 is recessed from the air bearing surface (ABS) and abuts notch pole 220. Top pole 202 and bottom pole 204 are connected to each other distal from the ABS by back gap closer 230. Conductive coils 208 surround back gap closer 230. In FIG. 2c, base pole 222 can be seen in the top view of magnetic writer 200 because notch pole 220 has a substantially similar shape to first top pole portion 210 (described in more detail below).

In operation, the ABS of magnetic writer 200 faces a surface of magnetic disc 12. Magnetic disc 12 travels or rotates in a direction relative to magnetic writer 200 as indicated by arrow A. To write data, an electric current is caused to flow through conductive coils 208. The magnetomotive force (mmf) in the coils magnetizes the combined pole structure of magnetic writer 200 and induces a magnetic field across write gap 206 between the top pole 202 and bottom pole 204. Top pole 202 is the trailing pole of top pole 202 and bottom pole 204 and is used to physically write data to magnetic disc 12. In particular, first top pole portion 210 writes data to magnetic disc 12, since this is the portion of the trailing pole nearest write gap 206.

Magnetic writer 200 provides a high gradient field at the ABS. When an electric current is caused to flow through conductive coils 208, a magnetic flux is caused to flow through top pole 202 and bottom pole 204, as is shown by the magnetic flux arrows, M, on each portion of top pole 202 and bottom pole 204. For optimal functionality of magnetic writer 200, the magnetic flux should be flowing parallel or substantially parallel to the ABS at the writing pole (first top pole portion 210). As is shown, the magnetic flux flows perpendicular to the ABS through second top pole portion 214. By incorporating top pole extension 212, the magnetic flux direction is changed from flowing perpendicular to the ABS at second top pole portion 214 to flowing substantially parallel to the ABS at first top pole portion 200. Top pole extension 212 has more length than first top pole portion 210 along the ABS, which allows the magnetic flux to transition from flowing perpendicular to the ABS at second top pole portion 214 to generally parallel to the ABS at first top pole portion 210. This minimizes distortion to data transitions on magnetic disc 12, which are formed at first top pole portion 210 where the writing field is equal to the effective dynamic coercivity of magnetic disc 12. Furthermore, as can be seen in FIG. 2b, top pole extension 212 has a uniform width, w, at the ABS. This reduces or eliminates excessive fringe erasure fields emanating from top pole extension 212, since the uniform width at the ABS prevents high magnetization levels. Also, this design minimizes the area of overlap between base pole 222 and top pole extension 212 to keep fringe fields below erasure threshold.

In a preferred embodiment, notch pole 220 has a substantially similar shape to first top pole portion 210. Notch pole 220 thus has a substantially flared shape extending away from the ABS, as does first top pole portion 210 (FIG. 2c). Notch pole 220 abuts base pole 222, and both are oriented such that their long dimension extends away from the ABS. This configuration causes the leading edge pole (notch pole 220) to magnetize strongly in a direction perpendicular to the ABS. Consequently, the total field strength in write gap 206 is maximized at the ABS where magnetic disc 12 is written. At the same time, distortion to media transitions at the trailing pole (first top pole portion 210) is prevented.

The magnetic throat height of magnetic writer 200 is the distance from the ABS to a back edge of first top pole portion 210 distal from the ABS. In magnetic writer 200, notch pole 220 extends away from the ABS to the magnetic throat height of magnetic writer 200. A magnetization of notch pole 220 is oriented generally perpendicular to the ABS. Notch pole 220 is formed in a plated gap process (described below), which allows for the formation of a substantially thicker notch pole 220. Consequently, this allows for stronger magnetic fields at gap layer 206.

Magnetic writer 200 may be formed by, for example, a plated gap process. Base pole 222 is first formed such that it is recessed from the ABS plane (which is later set during machining of the slider). Base pole 222 has a substantially flared or funneled shape such that the narrow portion of the substantially flared or funnel shape is proximate to the ABS. Base pole 222 is then encapsulated in dielectric and planarized to provide a base onto which notch pole 220 is formed. After a seed layer is applied, notch pole 220 is plated into a photomask having a substantially funneled shape. Gap layer 206 and first top pole portion 210 are then plated into the same photomask. First top pole portion 210 must be plated thick enough to allow for the subsequent ion mill of the seed layer and removal of the seed layer by a CMP process. This structure is then encapsulated in a dielectric, and a chemical mechanical polish (CMP) planarization exposes a surface of first top pole portion 210 opposite gap layer 206. After conductive coils 208 are plated, top pole extension 212 is then formed on the exposed surface of first top pole portion 210 such that top pole extension 212 is in direct contact with first top pole portion 210. Back gap closer 230 and second top pole portion 214 are then formed to complete magnetic writer 200. Plated gap processing of magnetic writer 200 has the advantage of requiring very little ion milling of notch pole 220 since only the thin seed layer requires milling.

For magnetic writer 200 as shown in FIGS. 2a–2c, magnetic response to passing an electric current through the coils is a strong field in the vicinity of write gap 206, a high gradient in the trailing pole (first top pole portion 210) region, relatively uniform cross-track response, and acceptable stray fringing fields. The response of magnetic disc 12 is good overwrite of previous data and sharp transitions with minimal cross track distortion.

In summary, the present invention is a magnetic writer having an air bearing surface for confronting a surface of a rotating disc. The magnetic writer includes a bottom pole and a top pole. The top pole includes a first top pole portion and a second top pole portion connected by a top pole extension. The top pole extension, which preferably has a uniform width at the air bearing surface, orients a magnetization of the first top pole portion substantially parallel to an air bearing surface of the magnetic writer. This configuration reduces the fringe fields emanating from the top pole, which in turn minimizes distortion to transitions on the disc. The bottom pole includes a base pole and a notch pole. The base pole is recessed from the air bearing surface to prevent or reduce fringe erasure fields. The notch pole, which abuts the base pole, has a magnetization oriented generally perpendicular to the air bearing surface, which maximizes the total field strength in the write gap region, yet avoids distortion to media transitions at the first top pole portion. In one embodiment, the notch pole extends from the air bearing surface beyond the magnetic throat height of the magnetic writer. In another embodiment, the notch pole extends from the air bearing surface to the magnetic throat height of the magnetic writer. Preferably, both the base pole and the notch pole have a flared shape to increase magnetic flux near the air bearing surface.

Although the present invention has been described with reference to preferred embodiments, workers skilled in the art will recognize that changes may be made in form and detail without departing from the spirit and scope of the invention.

The invention claimed is:

1. A magnetic writer comprising:
 a bottom pole including a first bottom pole portion and a second bottom pole portion; and
 a top pole including a first top pole portion and a second top pole portion connected by a top pole extension at a front surface of the magnetic writer, the first top pole portion positioned proximate to the second bottom pole portion and having a substantially similar shape as the first top pole portion at the front surface, the top pole extension orienting a magnetization of the first top pole portion substantially parallel to the front surface, wherein the second bottom pole portion extends from the front surface to at least a magnetic throat height of the magnetic writer, and wherein the magnetic throat height is a distance from the front surface to an edge of the first top pole portion distal from the front surface.

2. The magnetic writer of claim 1, wherein the top pole extension has a uniform width at the front surface.

3. The magnetic writer of claim 1, wherein the top pole extension has a greater length along the front surface than the first top pole portion.

4. The magnetic writer of claim 1, wherein the first bottom pole portion is recessed from the front surface.

5. The magnetic writer of claim 1, wherein a magnetization of the second bottom pole portion is oriented generally perpendicular to the front surface.

6. The magnetic writer of claim 1, wherein the second top pole portion is substantially planar.

7. The magnetic recording head of claim 1, further comprising:
   a conductive coil positioned such that at least a portion of the conductive coil is positioned between the bottom pole and the top pole.

8. The magnetic writer of claim 7, wherein the at least a portion of the conductive coil is encapsulated in a gap layer which fills an area between the bottom pole and the top pole.

9. The magnetic writer of claim 1, wherein the bottom pole and the top pole are connected by a back gap closer distal from the front surface.

10. A magnetic writer comprising:
    a bottom pole including a base pole and a notch pole; and
    a top pole including a first top pole portion and a second top pole portion connected by a top pole extension, the first top pole portion positioned across a gap from the notch pole, the top pole extension having a uniform width at a medium confronting surface and a greater length along the medium confronting surface than the first top pole portion, wherein the notch pole extends from the medium confronting surface to at least a magnetic throat height of the magnetic writer, and wherein the magnetic throat height is a distance from the medium confronting surface to an edge of the first top pole portion distal from the medium confronting surface.

11. The magnetic writer of claim 10, wherein the base pole is recessed from the medium confronting surface to prevent fringe erasure fields.

12. The magnetic writer of claim 10, wherein the base pole and the notch pole have a substantially funnel cross-section such that a narrower portion of the substantially funnel cross-section is proximate to the medium confronting surface.

13. The magnetic writer of claim 10, wherein the bottom pole and the top pole are connected by a back gap closer distal from the medium confronting surface.

14. A magnetic writer comprising:
    a top pole including a first top pole portion, a second top pole portion, and a top pole extension positioned therebetween;
    a bottom pole including a first bottom pole portion and a second bottom pole portion, the first bottom pole portion being recessed from a front surface, the second bottom pole portion being positioned proximate to the top pole and extending from the front surface to at least a magnetic throat height of the magnetic writer, wherein the magnetic throat height is a distance from the front surface to an edge of the first top pole portion distal from the front surface; and
    a gap layer positioned between the top pole and the bottom pole.

15. The magnetic writer of claim 14, wherein at least a portion of a conductive coil is positioned within the gap layer.

16. The magnetic writer of claim 14, wherein the first top pole portion is positioned across the gap layer from the second bottom pole portion.

17. The magnetic writer of claim 16, wherein the top pole extension has a uniform width at the front surface and a greater length along the front surface than the first top pole portion.

18. The magnetic writer of claim 16, wherein the top pole extension orients a magnetization of the first top pole portion substantially parallel to the front surface of the magnetic writer.

* * * * *

UNITED STATES PATENT AND TRADEMARK OFFICE
CERTIFICATE OF CORRECTION

PATENT NO. : 7,187,519 B2 Page 1 of 1
APPLICATION NO. : 10/726881
DATED : March 6, 2007
INVENTOR(S) : Frank E. Stageberg et al.

It is certified that error appears in the above-identified patent and that said Letters Patent is hereby corrected as shown below:

On Title page item 56
Column 2 Patent Reference 6,504,677,
delete "Chen et al.", insert --Han et al.--

Signed and Sealed this

Eighth Day of May, 2007

JON W. DUDAS
*Director of the United States Patent and Trademark Office*